(No Model.)
D. G. TENNEY.
HORSE SHIELD.
No. 511,558. Patented Dec. 26, 1893.
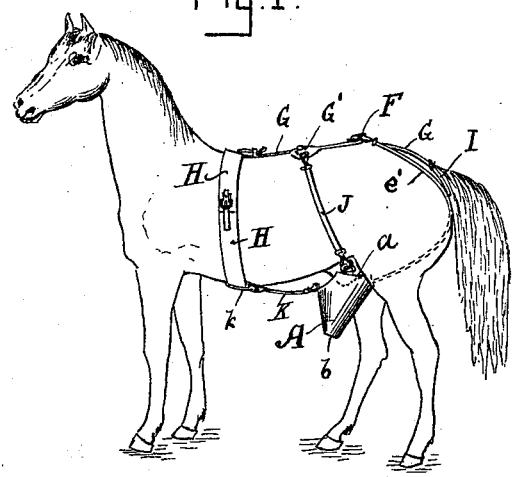
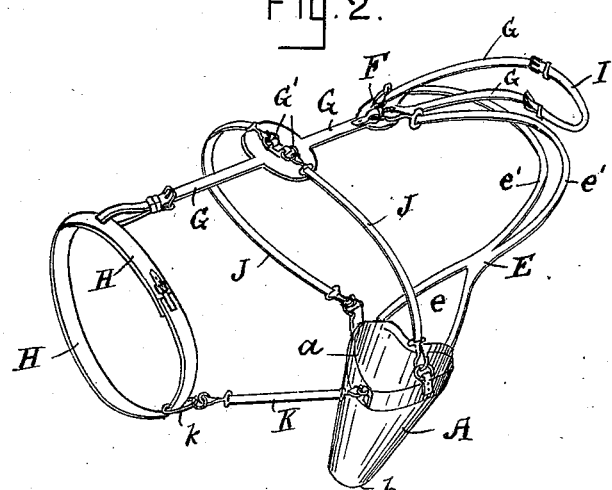
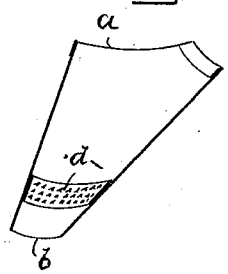
Witnesses.
Hosea W. Libby
James S. Cowden
Inventor.
Daniel G. Tenney
by Edwin Planta
attorney.
THE NATIONAL LITHOGRAPHING COMPANY,
WASHINGTON, D. C.

UNITED STATES PATENT OFFICE.

DANIEL G. TENNEY, OF NEWBURY, MASSACHUSETTS.

HORSE-SHIELD.

SPECIFICATION forming part of Letters Patent No. 511,558, dated December 26, 1893.

Application filed November 9, 1891. Serial No. 411,294. (No model.)

*To all whom it may concern:*

Be it known that I, DANIEL G. TENNEY, a citizen of the United States, residing at Newbury, in the county of Essex and State of Massachusetts, have invented certain new and useful Improvements in Horse-Shields, of which the following, taken in connection with the accompanying drawings, is a specification.

The object of my invention is to produce a shield for horses especially adapted for use upon stallions to prevent them from abusing themselves, to which practice some horses become habited thereby injuring their vitality and usefulness.

The invention consists in a shield constructed in the manner as hereinafter fully described and pointed out in the claim.

Referring to the accompanying drawings Figure 1. represents a horse with a shield embodying my invention applied. Fig. 2. is a perspective view of the shield and harness for securing the same upon the animal. Fig. 3 is a vertical section through the shield.

A, represents the shield which is of cone shape, and formed of any suitable flexible material. The shield incloses the animal's sheath. The upper end $a$, rests against the body of the animal and the lower end $b$, is formed with an opening for the free escape of water. Near the lower end $b$, on the inside of the shield is secured a piece or pieces of card clothing $d$, preferably such as is used on the licker-in roller, said card clothing being sufficiently near the base or upper end of the shield so that when the animal causes a projection from the sheath for the purpose of making water, the said projection will not come into contact with the card-clothing and the shield will not interfere with his action, but should he make any further projection from the sheath it will be met by the card clothing $d$ and be caused to retract.

The shield is supported upon the animal by harness connected to the surcingle, the connections between the parts being preferably made by snap hooks, which can readily be secured or released as may be required.

To the rear of the shield is secured a split strap E, the space $e$, being of sufficient size to allow the animal's testicles to pass through. The two rear portions $e'$, of said strap E, pass between the rear legs and on each side of the tail of the animal, and are by snap hooks secured at F, to a back strap G, the forward end of which is buckled to the surcingle H, and the rear ends are attached to the crupper I. To each side of the shield, by means of snap hooks are attached loin straps J, that by snap hooks, at their upper ends are attached to the back strap at G'; and to the front portion of the shield A, is secured one end of a strap K, the other end of which is by a snap hook attached to a hook $k$, on the surcingle H.

It will be seen that by reason of having the harness supporting the shield attached to the surcingle it does not in any way interfere with the free movements of the animal and by having the shield of flexible material it does not interfere when the animal wishes to lie down and when it is required to be cleansed it can readily be turned inside out and washed or scrubbed, and when it is desired to remove the apparatus all that has to be done is to unbuckle the surcingle, release the two snap hooks that connect the split strap E to the back strap G, and the snap hook that connects the loin straps to the shield on the near side of the horse. Thus by releasing three snap hooks and the surcingle the apparatus is free to be removed.

What I claim is—

A reversible shield of soft material, substantially cone shaped, the apex or point of which is cut off, thereby forming a hole for the escape of water, inwardly and upwardly projecting flexible points or pins upon the inside of the cone, near the opening, at such distance from the base or upper end of the shield as not to interfere with the projecting member while urinating, and harness for securing the shield in place, substantially as set forth.

In testimony whereof I have signed my name to this specification, in the presence of two subscribing witnesses, on this 26th day of October, A. D. 1891.

DANIEL G. TENNEY.

Witnesses:
L. W. HOWES,
EDWIN PLANTA.